No. 790,900. PATENTED MAY 30, 1905.
O. JUNGHANS.
APPARATUS FOR PRODUCING ILLUMINATING EFFECTS.
APPLICATION FILED OCT. 12, 1904.

4 SHEETS—SHEET 1.

WITNESSES:
Fred White
René Bruine

INVENTOR:
Oskar Junghans,
By Attorneys,
Arthur E. Draser & Co.

No. 790,900. PATENTED MAY 30, 1905.
O. JUNGHANS.
APPARATUS FOR PRODUCING ILLUMINATING EFFECTS.
APPLICATION FILED OCT. 12, 1904.
4 SHEETS—SHEET 2.
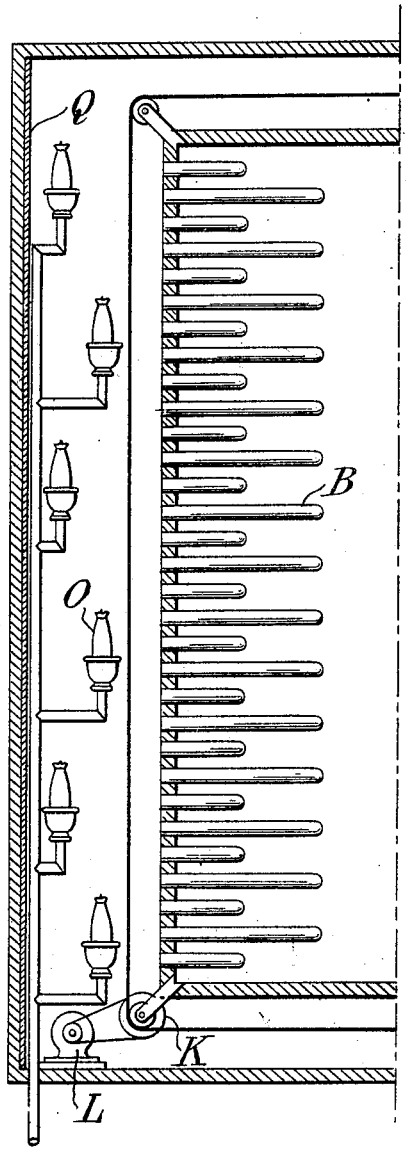
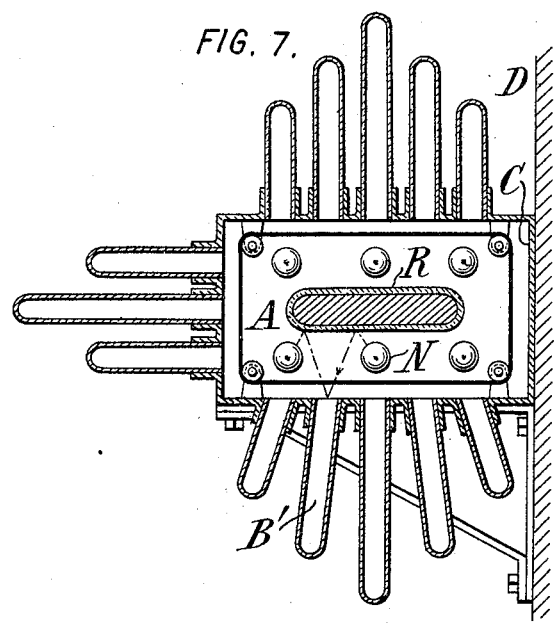
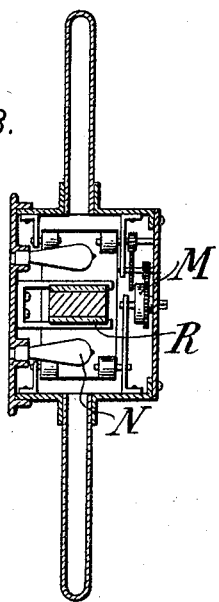
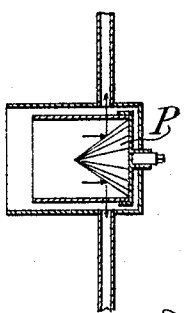
WITNESSES:
Fred White
René Buine
INVENTOR:
Oskar Junghans,
By Attorneys, No. 790,900. PATENTED MAY 30, 1905.
O. JUNGHANS.
APPARATUS FOR PRODUCING ILLUMINATING EFFECTS.
APPLICATION FILED OCT. 12, 1904.

4 SHEETS—SHEET 3.

WITNESSES:
Fred White
René Bruine

INVENTOR:
Oskar Junghans,
By Attorneys,
Arthur C. Fraser & Co.

No. 790,900.                                    Patented May 30, 1905.

UNITED STATES PATENT OFFICE.

OSKAR JUNGHANS, OF SCHRAMBERG, GERMANY.

APPARATUS FOR PRODUCING ILLUMINATING EFFECTS.

SPECIFICATION forming part of Letters Patent No. 790,900, dated May 30, 1905.

Application filed October 12, 1904. Serial No. 228,246.

*To all whom it may concern:*

Be it known that I, OSKAR JUNGHANS, a subject of the King of Würtemberg, residing at Schramberg, Kingdom of Würtemberg, German Empire, have invented certain new and useful Improvements in Apparatus for Producing Illuminating Effects, of which the following is a specification.

In a prior patent granted to me September 6, 1904, No. 769,348, I have described an apparatus for producing striking illuminating effects, and which is especially useful for advertising purposes, in which light is introduced from an opaque chamber into the ends of elongated transparent elements, so as to cause a series of long flashes of light, the successive flashes being preferably of different colors. The present application provides certain improvements in such apparatus whereby the space which can be used for advertising purposes is much enlarged, and, in fact, may be made of practically unlimited size, whereby the apparatus can be more conveniently located in shop-windows and against vertical walls and whereby other advantages referred to in detail hereinafter may be secured.

The accompanying drawings illustrate an embodiment of the invention.

Figure 1:
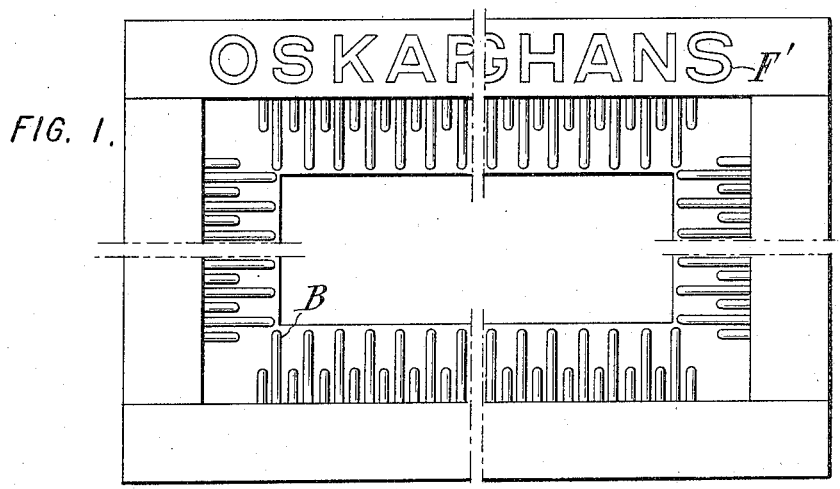
Figure 2:
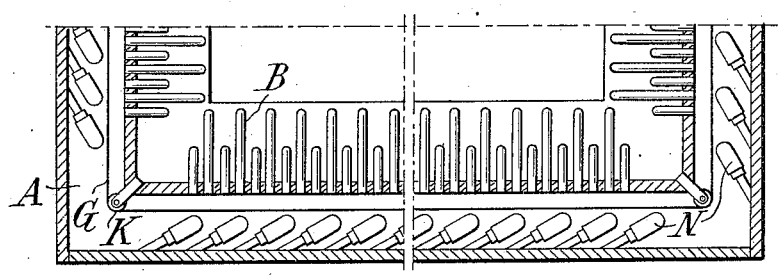
Figure 3:
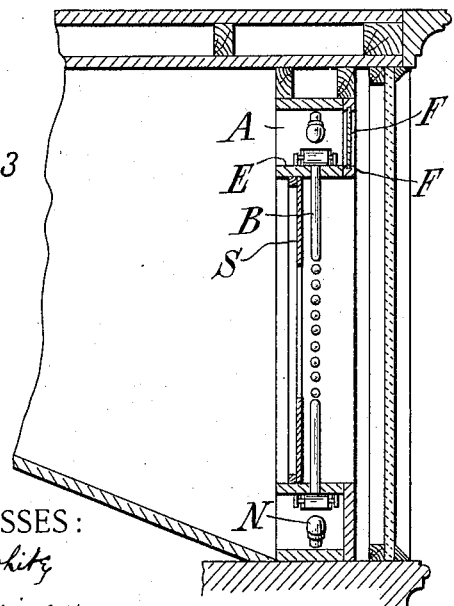
Figure 4:
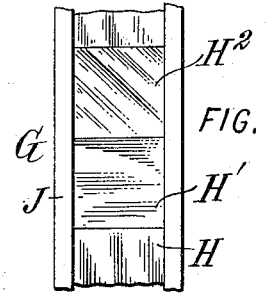
Figure 5:
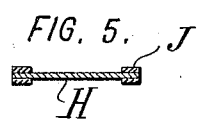
Figure 10:
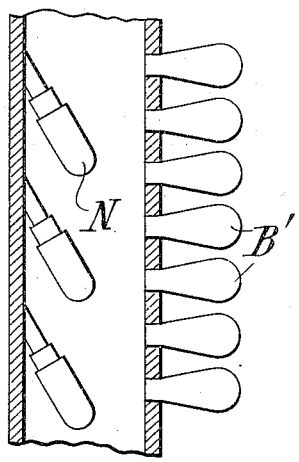
Figure 11:
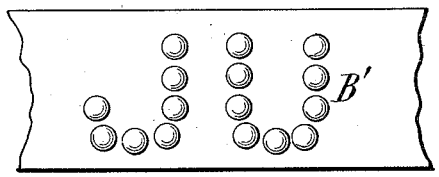
Figure 12:
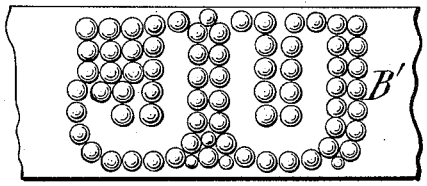
Figure 13:
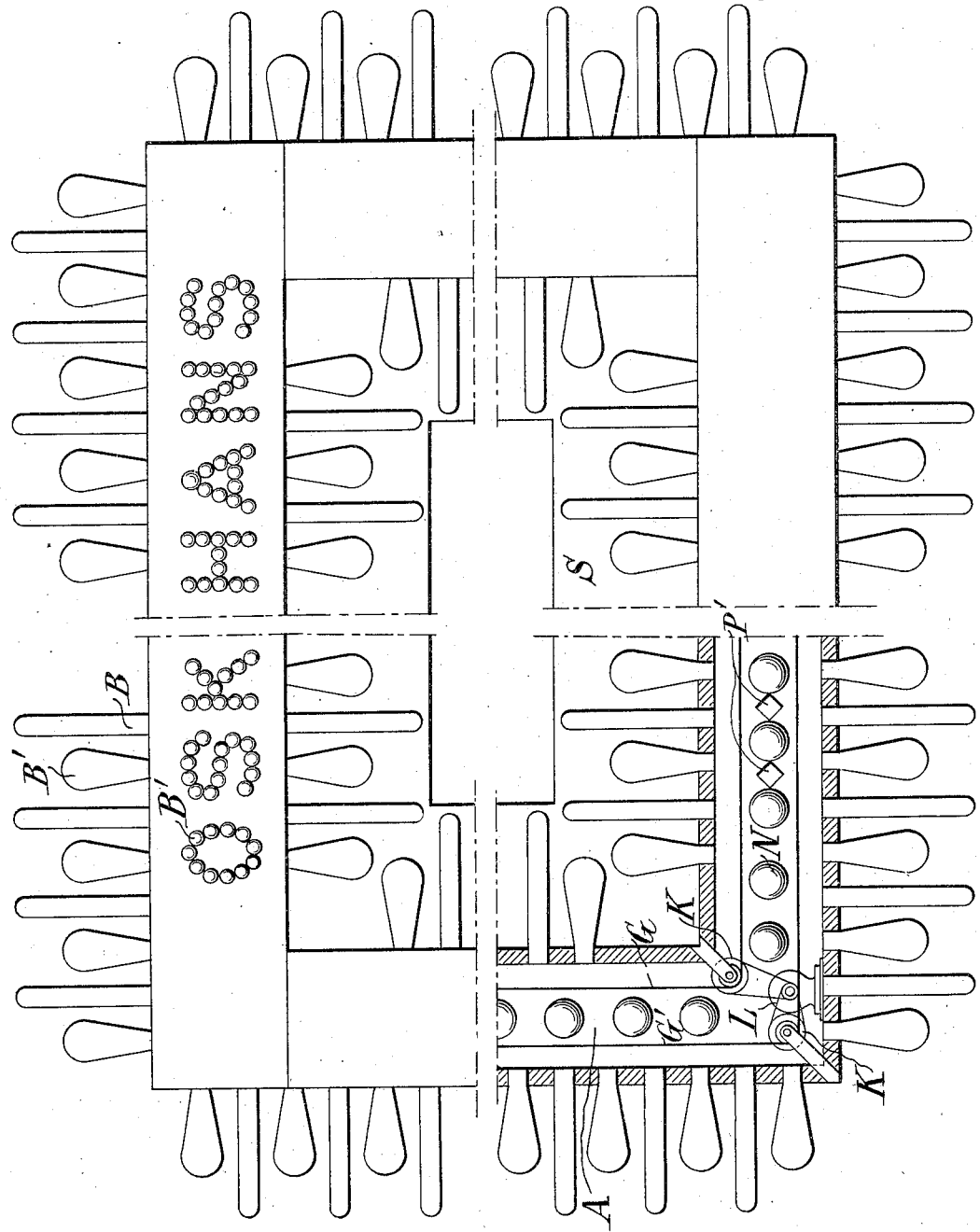

Figure 1 is an elevation showing the four corners of an apparatus especially adapted for shop-windows. Fig. 2 is a section parallel with the face of a portion of the apparatus shown in Fig. 1. Fig. 3 is a vertical cross-section through the apparatus in place in a shop-window. Figs. 4 and 5 are respectively a plan and cross-section of a flexible strip or belt for flashing the different colors. Fig. 6 is a section similar to Fig. 2, showing the apparatus employing gas-lamps and showing certain other slight modifications. Fig. 7 is a section parallel with the front face, showing the apparatus mounted upon a vertical side wall. Fig. 8 is a vertical cross-section of the apparatus in Fig. 7. Fig. 9 is a vertical cross-section illustrating a modified arrangement of the source of light. Fig. 10 is a sectional view showing a form of transparent element, and Figs. 11 and 12 are fragmentary elevations illustrating several methods of practicing my invention. Fig. 13 is an elevation similar to Fig. 1, partly in vertical section, showing the preferred form of my invention.

Referring to the embodiments illustrated, a chamber is provided which is interiorly illuminated and from one or more walls of which elongated transparent elements extend in a direction approximately or substantially normal to the wall, so that the light produced in the chamber is dispersed lengthwise throughout said transparent elements, and a succession of differently-colored sheets moves continuously between the source of light and the elongated transparent elements, so as to produce a succession of long flashes. The apparatus is arranged so that the elongated transparent elements are in a substantially vertical plane. The light is transmitted through the elongated transparent elements on a similar principle to that utilized in the well-known luminous fountains and waterfalls, the surfaces of the tubes being preferably frosted or coated with a translucent varnish, which intensifies the effect.

The chamber A may be in the form of a hollow frame, as shown in Fig. 1, with the elongated transparent elements B projecting into the space within the frame or both within and on the outside of the frame, as shown in Fig. 13, or it may be a closed figure, as in Fig. 7. In any case it has, preferably, at least one flat side C, which is free from the transparent elements, so as to permit its attachment against a vertical wall, such as D. The form indicated in Figs. 1 and 13 provides a large central space, within which advertisements may be placed and surrounded by the apparatus like a frame. Although the wall E of the illuminated chamber from which the elongated transparent elements B extend should be opaque, yet the front wall F may be translucent, carrying an advertisement in opaque letters upon it, or it may be an opaque wall with transparent portions F' showing the advertisement. By arranging the chamber around the elongated transparent elements it affords the largest available space for the advertising matter which may be printed on its face. This is a point of great practical importance.

The elongated transparent elements B may be of various shapes and may be variously arranged relatively to the illuminated chamber. For example, according to Fig. 6 these elements are shown only along the vertical sides of the apparatus, being omitted from the top and bottom.

In Fig. 7 there are shown two sets of parallel elements and one set of diverging elements. The arrangement in this respect may be varied within a wide range, according to the individual taste and ingenuity of the designer. The elongated transparent elements may be of solid glass or other transparent material, or they may be hollow tubes of the same material, either empty or containing a liquid. For the longest elements, such as ten or twelve feet or more, and especially when they are curved, tubes filled with liquid are best. The ends of the tubes or rods may be fastened in any suitable way in sockets in the wall of the chamber.

A feature of improvement, without which it would be practically impossible to make the chamber very large, is the introduction of the differently-colored sheets or screens between the source of light and the ends of the tubes or rods by means of a long flexible belt G instead of such sheets being carried by a cylinder, as shown in my aforesaid patent. This belt comprises a succession of sheets H, H', H², &c., which are of different colors and preferably all transparent, though the introduction of an opaque sheet between two transparent ones to cut off the light entirely during one of the intervals is within the invention. The sheets H, H', H², &c., for example, may be made of thin mica, being held together by strips J of leather or similar tough flexible material along their edges. The complete belt is passed around a number of pulleys K and is driven continuously by any suitable means, such as the electric motor L, Fig. 6, or the spring and clockwork M, Fig. 8.

Any suitable lamps may be used—such, for example, as the incandescent electric lamps N or the incandescent gas-lamps O, Fig. 6—or the reflector P may be used, Fig. 9, which receives the light from an oil-lamp at the back of the apparatus and reflects it into the elongated transparent elements. Preferably in order to distribute the light over the different parts of the belt, and thus to all the different elongated transparent elements equally, reflectors are provided at the backs of the lights—such, for example, as the mirror Q of Fig. 6, running along the outer side wall of the chamber, or the mirror R of Figs. 7 and 8, arranged at the center of the several lamps N. Referring to Fig. 7, it will be seen that the direct light from the lamps does not enter the tube B' to the same extent as it does the adjacent tubes. The mirror, however, serves to transmit directly into the tube B' a quantity of light approximately sufficient to make up the deficiency, the light being reflected in the manner indicated by the broken lines.

If the transparent elements are used on opposite sides of a chamber such as is shown in Fig. 13, two belts G G' may be used, the lamps being arranged between them. In this case rectangular reflectors, such as P', may be used between the lamps, as shown.

It will be understood that the elements B may be of any desired shape or form and that they may be arranged in any manner to obtain the effect desired. In Figs. 10 and 13 I have shown them in the form of incandescent-electric-lamp bulbs, which are disposed in a similar manner to those in Fig. 6. This form of transparent element has the special advantage that it produces the effect of an electric lamp with a great reduction in cost of operation, one source of light, such as N, serving to illuminate a number of the bulb-shaped elements B'.

One valuable application of my invention is its use as an illuminated sign, and for this purpose the bulb form of element is especially adapted. In Fig. 11 I have shown a series of bulbs arranged in the form of letters "J U," the background being opaque and the source of light being arranged in the chamber at the rear thereof. Fig. 13 shows a similar arrangement in the letters "OSK HANS" at the top of the figure. It will be seen that one or more lights may be so mounted within the chamber as to produce substantially the effect of a letter composed of numerous incandescent electric lamps. In Fig. 12 I have illustrated a modification in which the bulb elements are arranged to form the background, the letter outline being in this case opaque. It will be understood that in any case the traveling multicolored strip may be used, if desired.

With the apparatus arranged in a shop-window the rear face of the chamber A may be opened, so that the light may be utilized to illuminate articles in the window which are visible from the center of the apparatus. Preferably a background of black material S is arranged behind the tubes B in such a case, so that there shall be no interference with the desired optical effect by reason of the light in the rear.

What I claim is—

1. In an apparatus for producing illuminating effects, the combination with an interiorly-illuminated chamber, of elongated transparent elements one end of each of which passes through a wall of said chamber and each of which extends therefrom in a substantially vertical plane and in a direction approximately normal to such wall, so that light produced in said chamber is dispersed lengthwise through said transparent elements to produce elongated rays or beams, and a flexible belt composed of a succession of differently-colored sheets moving continuously between the source of light and said elongated transparent elements to produce a succession of elongated flashes.

2. In an apparatus for producing illuminating effects, the combination with an interiorly-illuminated chamber, of elongated transparent elements one end of each of which extends therefrom in a substantially vertical plane and in a direction approximately normal to such wall, so that light produced in said chamber is dispersed lengthwise through said transparent elements to produce elongated rays or beams, and a flexible belt composed of a succession of differently-colored sheets moving continuously between the source of light and said elongated transparent elements to produce a succession of elongated flashes, lamps within said chamber and constituting the source of light, and a reflector arranged behind the lamps to distribute the light upon said belt.

3. In an apparatus for producing illuminating effects, the combination with an interiorly-illuminated chamber, of elongated transparent elements one end of each of which passes through a wall of said chamber and each of which extends therefrom in a substantially vertical plane and in a direction approximately normal to such wall, so that light produced in said chamber is dispersed lengthwise through said transparent elements to produce elongated rays or beams, and a succession of differently-colored sheets moving continuously between the source of light and said elongated transparent elements to produce a succession of elongated flashes, at least one flat side of said chamber being unprovided with such elongated elements to adapt the apparatus for attachment against a vertical wall.

4. In an apparatus for producing illuminating effects, the combination with a hollow frame having an interiorly-illuminated chamber, of elongated transparent elements, each of which at one end passes through a wall of said chamber and extends therefrom into the space within such frame, in a substantially vertical plane and in a direction approximately normal to such wall, so that light produced in said chamber is dispersed lengthwise through said transparent elements to produce elongated rays or beams, and a succession of differently-colored sheets moving continuously between the source of light and said elongated transparent elements to produce a succession of long flashes, said frame having at least one free flat outer side to adapt the apparatus for attachment against a vertical wall.

5. In an apparatus for producing illuminating effects, the combination with a hollow frame having an interiorly-illuminated chamber, of elongated transparent elements, each of which at one end passes through a wall of said chamber and extends therefrom into the space within such frame, in a substantially vertical plane and in a direction approximately normal to such wall, so that light produced in said chamber is dispersed lengthwise through said transparent elements to produce elongated rays or beams, and a succession of differently-colored sheets moving continuously between the source of light and said elongated transparent elements to produce a succession of long flashes.

6. In an apparatus for producing illuminating effects, the combination with a hollow frame having an interiorly-illuminated chamber, of elongated transparent elements, each of which at one end passes through a wall of said chamber and extends therefrom into the space within such frame, in a substantially vertical plane and in a direction approximately normal to such wall, so that light produced in said chamber is dispersed lengthwise through said transparent elements to produce elongated rays or beams, and a succession of differently-colored sheets moving continuously between the source of light and said elongated transparent elements to produce a succession of long flashes, the front wall of said chamber having an advertisement illuminated by the light within.

7. In an apparatus for producing illuminating effects, the combination with a hollow frame having an interiorly-illuminated chamber, of elongated transparent elements, each of which at one end passes through a wall of said chamber and extends therefrom into the space within such frame, in a substantially vertical plane and in a direction approximately normal to such wall, so that light produced in said chamber is dispersed lengthwise through said transparent elements to produce elongated rays or beams, and a succession of differently-colored sheets moving continuously between the source of light and said elongated transparent elements to produce, a succession of long flashes, said chamber being open at the rear.

8. In an apparatus for producing illuminating effects, the combination with a hollow frame having an interiorly-illuminated chamber, of elongated transparent elements, each of which at one end passes through a wall of said chamber and extends therefrom into the space within such frame, in a substantially vertical plane and in a direction approximately normal to such wall, so that light produced in said chamber is dispersed lengthwise through said transparent elements to produce elongated rays or beams, and a flexible belt comprising a succession of differently-colored sheets connected together by flexible strips at their edges and moving successively between the source of light and said elongated transparent elements to produce a succession of long flashes.

9. In an apparatus for producing illuminating effects, the combination with a hollow frame having an interiorly-illuminated chamber, of elongated transparent elements, each of which at one end passes through a wall of said chamber and extends therefrom into the space within such frame, in a substantially vertical plane and in a direction approximately normal to such wall, so that light produced in said chamber is dispersed lengthwise through said transparent elements to produce elongated rays or beams, and a succession of differently-colored sheets moving continuously between the source of light and said elongated transparent elements to produce a succession of long flashes, and a background of dark material arranged behind said elongated transparent elements.

10. In an apparatus for producing illuminating effects, in combination with a hollow frame having an interiorly-illuminated chamber A having its rear face open, and having upon its front face an advertisement illuminated from within the chamber, of elongated transparent elements B each of which at one end passes through an opaque wall E of said chamber and extends therefrom into the space within such frame, in a substantially vertical plane and in a direction approximately normal to the wall E, so that light produced in said chamber A is dispersed lengthwise through said transparent elements B to produce elongated rays or beams, a series of lamps arranged within said chamber to provide the illumination, a belt G comprising a succession of differently-colored sheets arranged between the lamps and the elongated transparent elements, pulleys K around which said belt extends, and means for rotating one of said pulleys to move said belt and produce a succession of long flashes in said elongated transparent elements.

In witness whereof I have hereunto signed my name in the presence of two subscribing witnesses.

OSKAR JUNGHANS.

Witnesses:
 EUGENE V. KEYES,
 FRED WHITE.